United States Patent [19]
Hobbs

[11] Patent Number: 5,482,195
[45] Date of Patent: Jan. 9, 1996

[54] FISH STRINGER

[76] Inventor: Sidney C. Hobbs, P.O. Box 334, Citronelle, Ala. 36522

[21] Appl. No.: 342,899

[22] Filed: Nov. 21, 1994

[51] Int. Cl.⁶ .................................................. A01K 97/20
[52] U.S. Cl. ................................... 224/103; 43/55
[58] Field of Search ................... 224/103; 43/55; 63/3, 7, 8; 132/278, 279; 24/709.4

[56] References Cited

U.S. PATENT DOCUMENTS

| D. 318,314 | 7/1991 | Watkins | D22/134 |
|---|---|---|---|
| 706,168 | 8/1902 | Dover | 24/709.4 |
| 731,245 | 6/1903 | Tilford | 24/709.4 |
| 1,538,119 | 5/1925 | King | 24/709.4 |
| 2,550,217 | 4/1951 | Bourque | 224/103 |
| 2,612,303 | 9/1952 | Butler | 224/103 |
| 2,760,700 | 8/1956 | Lien | 224/103 |
| 3,061,156 | 10/1962 | Gawthrop | 224/103 |
| 3,371,830 | 3/1968 | Parkman | 224/103 |
| 4,124,154 | 11/1978 | O'Russa | 224/78 |
| 4,827,661 | 5/1989 | Wendler | 43/55 |
| 4,976,382 | 12/1990 | Carpenter | 43/55 |
| 5,031,809 | 7/1991 | Roberts et al. | 224/103 |
| 5,038,514 | 8/1991 | Yong-Set | 43/54.1 |
| 5,301,859 | 4/1994 | Brummel | 224/103 |

FOREIGN PATENT DOCUMENTS 4898  of 1914  United Kingdom .................. 24/709.4

*Primary Examiner*—Henry J. Recla
*Assistant Examiner*—Charles R. Eloshway
*Attorney, Agent, or Firm*—David L. Baker; Henry S. Miller; Rhodes & Ascolillo

[57] ABSTRACT

A fish stringer apparatus, in combination with a fish stringer cord, has a substantially semi-hemispheric leg. There is a first end and a second end on the substantially semi-hemispheric leg. A hinge mechanism is attached to the first end. The hinge mechanism has a hinge base and there is a first stop and a second stop on the hinge base. There is a latch bar that has a hinge end and a latch end. The latch bar is hingedly connected to the hinge mechanism at the hinge end of the latch bar. A latch mechanism attached to the second end of the semi-hemispheric leg. The latch bar is releasingly placed in the latch mechanism. The latch bar abuts the second stop causing the latch end of the latch bar to stop below the entrance to the latch mechanism. This causes the latch bar to be bent above the entrance to the latch mechanism in order to springingly bias the latch end of the latch bar down into the latch mechanism by way of the entrance.

2 Claims, 3 Drawing Sheets

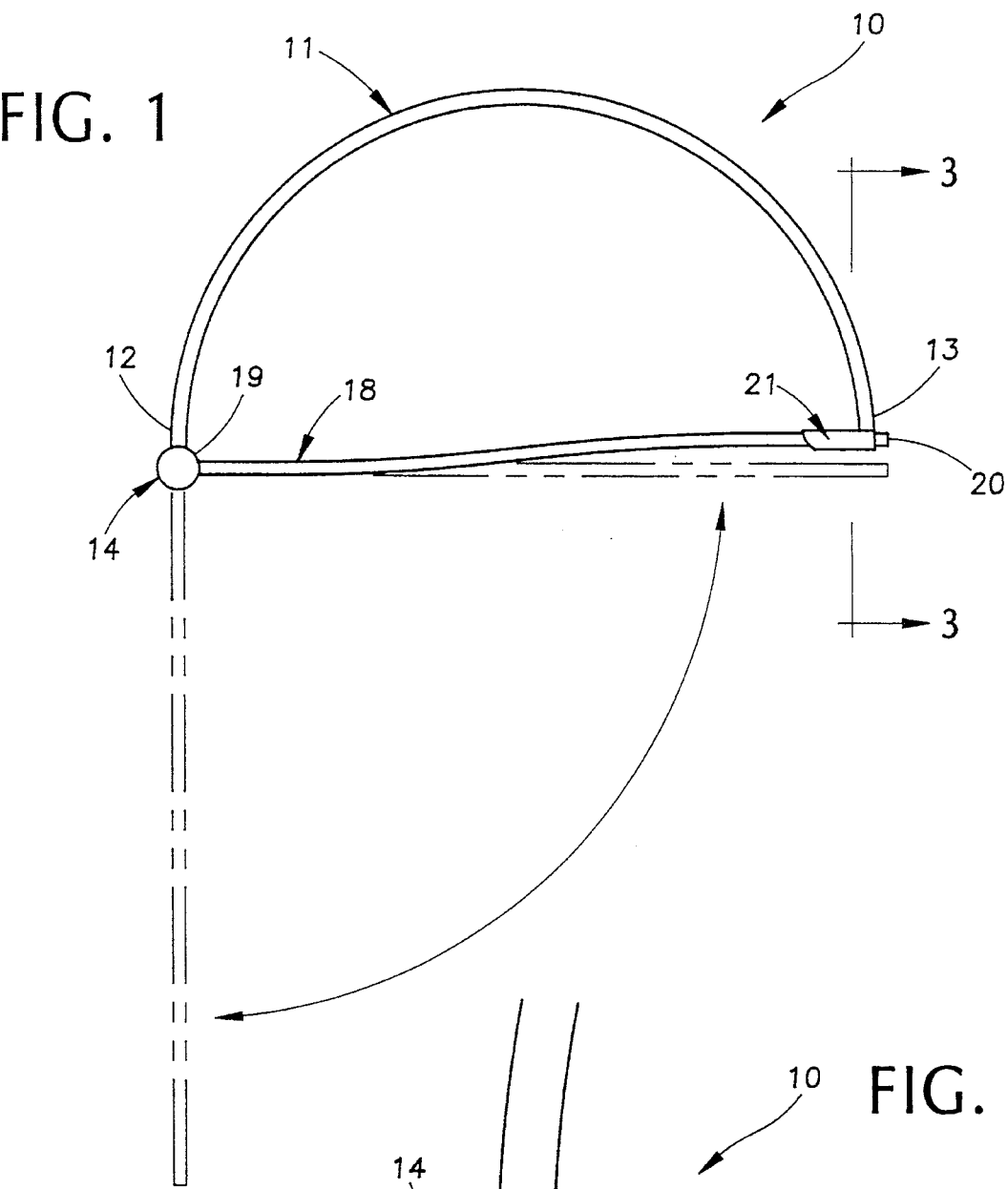

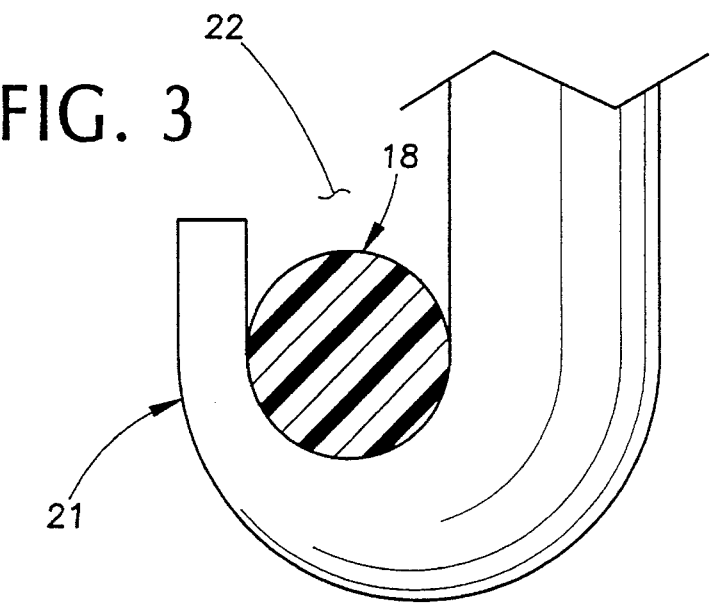
FIG. 3
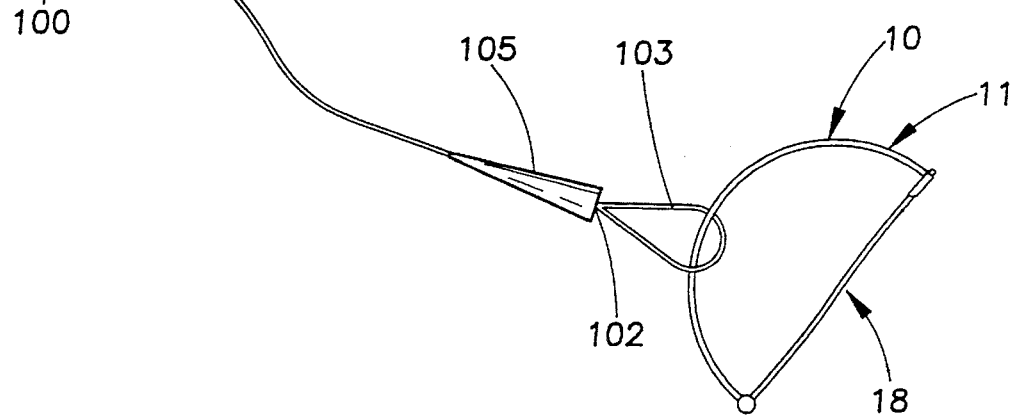
FIG. 4

FISH STRINGER

BACKGROUND OF THE INVENTION

1. Field of the Invention

This invention relates to a fish stringer to facilitate keeping fish alive and restrained in the water after caught.

2. Description of the Related Art

Keeping freshly caught fist alive and healthy at the fishing site has long been a problem for people who fish. Some people use creels or buckets filled with water into which the fish are placed. But as the fish breathe the water, the oxygen content of the water is lowered and the fish may die. Other people use a cord secured to the fish by running the cord through the gills of a fish and out the mouth of the fish. One end generally has a fixed barrier and the other end is free to thread through the gills and mouth of the fish and then secured to a boat or object on the bank of the body of water. The fish are then allowed to stay in the body of water they were caught in which tends to keep the fish alive and healthy for a longer period of time. However getting the fish back off the stringer usually means removing the fish caught last before one can access the fish first caught.

U.S. Pat. No. 4,124,154 to L. O'Russa on Nov. 07, 1978 for a Fish Stringer shows individual fish holders strung on a cord.

U.S. Pat. No. 4,827,661 to G. H. Wendler on May 09, 1989 for a Fish Stringer describes a stringer and bracket assembly. The stringer is a cord having a loop on one end and the cord has a series of interspaced loops along its length. The bracket is attached to a boat and has a cord retaining slot which grips the cord at a loop.

U.S. Pat. No. Des. 318,314 to D. D. Watkins on Jul. 16, 1991 for a Fish Stringer shows a fish stringer having a gill insertion lance that doubles as a retaining snap to secure the stringer to a boat or other object.

U.S. Pat. No. 5,038,514 to B. Yong-Set on Aug. 13, 1991 for a Fish Stringer describes a three-legged reclosable fastener with a snap closure and a spring loop to springingly bias two of the legs apart.

U.S. Pat. No. 5,301,859 to R. A. Brummel on Apr. 12, 1994 for a Fish Stringer shows a cord having at least two sections pivotally fastened together by swivels and having a removable end stop held onto the cord by a hairpin clip.

Since often the first caught fish should be cleaned first, the other fish have to be replaced onto the stringer if the user desires to keep them alive to be cleaned later. This presents a time and effort problem to the user. The present invention solves this problem by designing a fish stringer apparatus, removably attached to a cord, that allows the first to be caught fish to be removed from the fish stringer without having to remove and replace all the previously caught fish.

SUMMARY OF THE INVENTION

In one aspect of the present invention, a fish stringer apparatus is shown that has a substantially semi-hemispheric leg. There is a first end and a second end on the substantially semi-hemispheric leg. A hinge mechanism is attached to the first end of the semi-hemispheric leg. The hinge mechanism has a hinge base. There is a first stop and a second stop on the hinge base.

There is a latch bar that has a hinge end and a latch end. The latch bar is hingedly connected to the hinge mechanism at the hinge end of the latch bar. A latch mechanism is attached to the second end of the semi-hemispheric leg. The latch bar is releasingly placed in the latch mechanism. The latch bar abuts the second stop causing the latch end of the latch bar to stop below the entrance to the latch mechanism. This causes the latch bar to be bent above the entrance to the latch mechanism, by the user, so that the latch bar is springingly biased down into the latch mechanism by way of the entrance thereby springingly holding the latch end of the latch bar in the latch mechanism.

There is a cord cut to a length selected by the manufacturer or user. There is a lance end and an attachment end on the cord. The cord could be made of common cordage material such as cotton or nylon. The attachment end of the cord is releasingly attached to the semi-hemispheric leg. There is a lance or needle-like member (See FIG. 4) attached to the lance end. The lance could be made of plastic or metal and either tied, crimped or adhered by suitable waterproof adhesives to the cord.

In another aspect of the present invention, a fish stringer apparatus has a substantially semi-hemispheric leg. There is a first end and a second end on the substantially semi-hemispheric leg. There is a hinge mechanism attached to the first end. The hinge mechanism has a hinge base. There is a first stop and a second stop on the hinge base. There is a latch bar having a hinge end and a latch end. The latch bar is hingedly connected to the hinge mechanism at the hinge end of the latch bar. There is a latch mechanism attached to the second end. The latch bar is releasingly placed in the latch mechanism. The latch bar releasingly abuts the second stop. This causes the latch end of the latch bar to stop below the entrance to the latch mechanism (See FIG. 1) thereby causing the latch bar to be bent above the entrance to the latch mechanism in order to be springingly biased down into the latch mechanism by way of the entrance. This helps keep the latch bar secured into the latch mechanism.

There is a cord whose length may vary according to the needs of the user. The cord has a lance end and an attachment end. The attachment end of the cord is releasingly attached to the semi-hemispheric leg. One method is to place a loop in the attachment end and to insert the semi-hemispheric leg into the loop as shown in FIG. 4. There is a primary lance attached to the cord on the lance end of the cord and a secondary lance attached to the cord on the attachment end.

It is an object of this invention to provide an improvement to a standard fish stringer that allows a user to release the fish from the fish stringer easily.

It is another object of this invention to provide a fish stringer with or without a cord to thread through the gills of a fish.

BRIEF DESCRIPTION OF THE DRAWINGS

FIG. 1 is a right side elevational view of a Fish Stringer showing the latch bar of the restraining member moving from a closed position to an open position.

FIG. 2 is an enlarged partial cross-sectional view of the hinge mechanism.

FIG. 3 is an enlarged partial cross-sectional view of the latch bar along line 3—3 and an enlarged front elevational view of the latch mechanism.

FIG. 4 is a perspective view of the Fish Stringer.

DESCRIPTION OF THE PREFERRED EMBODIMENT

Figure 5:
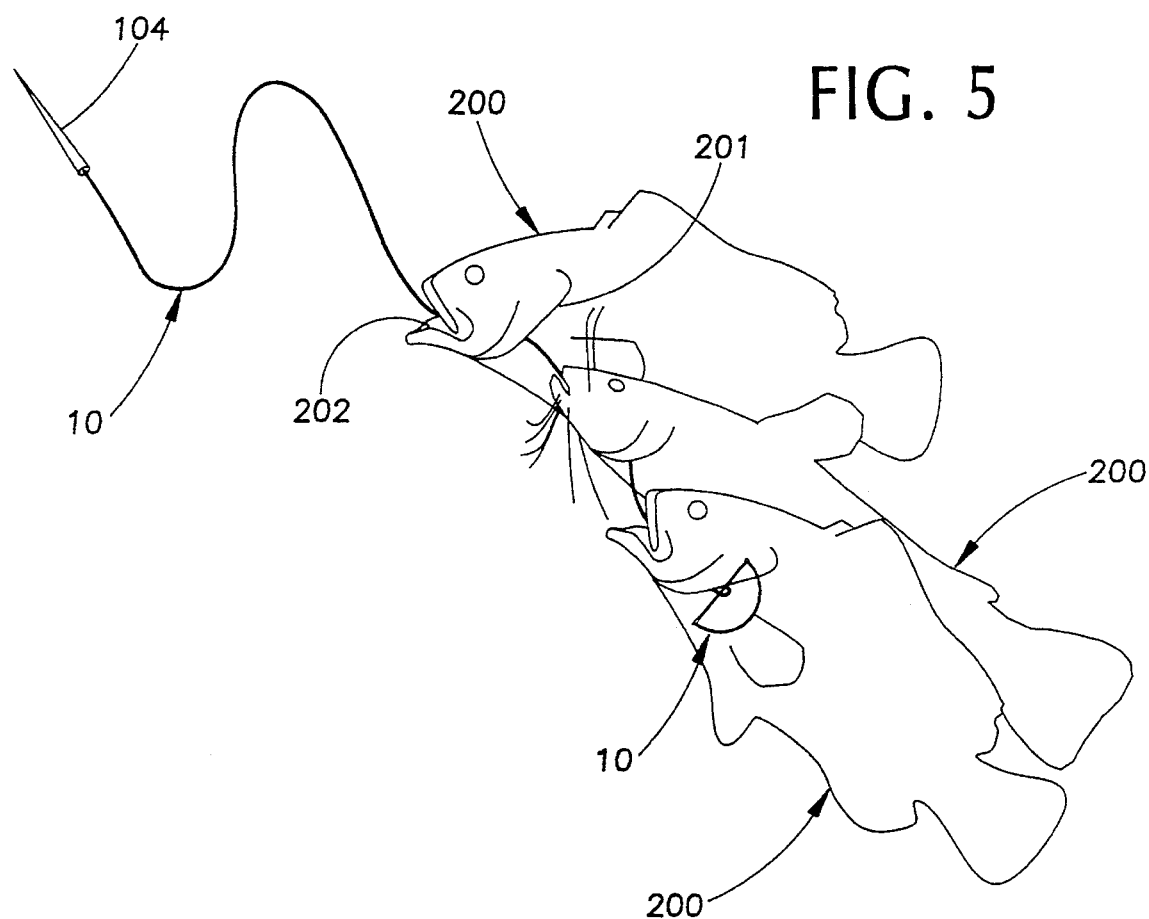
FIG. 5 is a perspective environmental view showing the Fish stringer with several fish attached.
Figure 6:
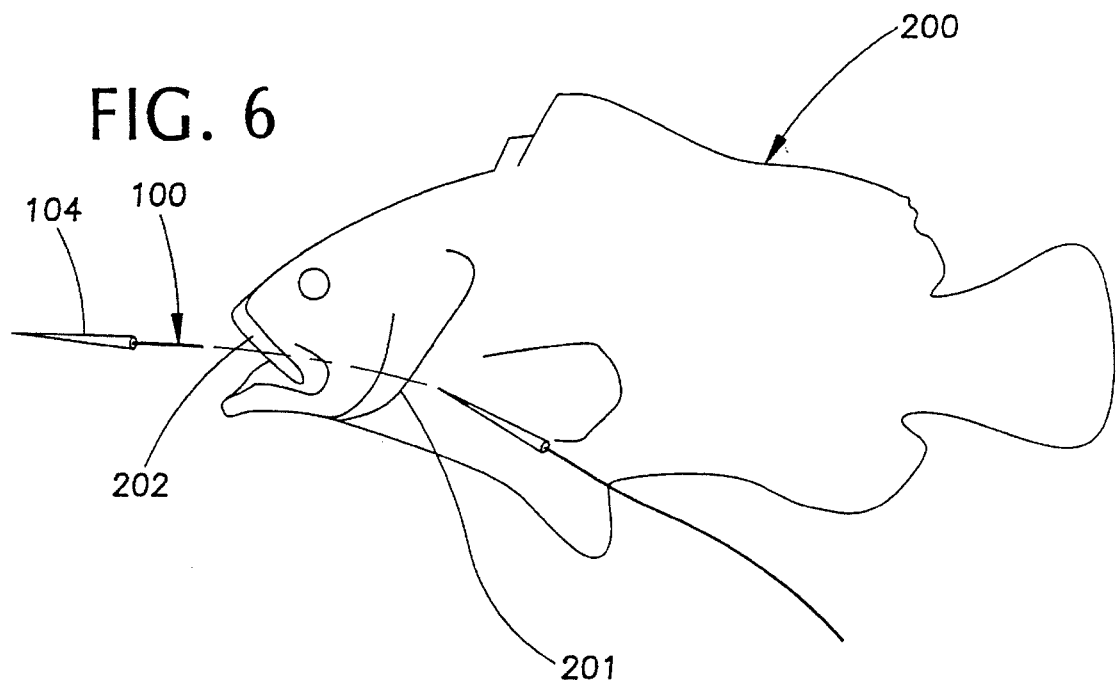
FIG. 6 is an enlarged environmental view showing the lance of the Fish Stringer being threaded through the gills of a fish.

Referring to FIGS. 1 through 6, a fish stringer apparatus 10, to be used with a fish stringer cord 100, is shown and described that has a substantially semi-hemispheric leg 11. There is a first end 12 and a second end 13 on the substantially semi-hemispheric leg 11. A hinge mechanism 14 is attached to the first end 12. The hinge mechanism 14 has a hinge base 15 and there is a first stop 16 and a second stop 17 on the hinge base 15. There is a latch bar 18 that has a hinge end 19 and a latch end 20. The latch bar 18 is hingedly connected to the hinge mechanism 14 at the hinge end 19 of the latch bar. The fish stringer apparatus may be made of any suitable metal (rolled or extruded or forged or any other suitable method) or plastic (molded or extruded or any other suitable method) that allows the leg and latch bar to have resilient springlike properties.

A latch mechanism 21 is attached to the second end 13 of the semi-hemispheric leg 11. The latch bar 18 is releasingly placed in the latch mechanism 21. The latch bar 18 abuts the second stop 17 causing the latch end 20 of the latch bar 18 to stop below the entrance 22 to the latch mechanism 21. This causes the latch bar 18 to be bent above the entrance 22 to the latch mechanism 21 in order to springingly bias the latch end 20 of the latch bar down into the latch mechanism 21 by way of the entrance 22. This tends to keep the latch bar 18 firmly in the latch mechanism 21.

There may be a cord 100 whose length may vary according to the needs of the user. The cord 100 has a lance end 101 and an attachment end 102. The attachment end 102 of the cord is releasingly attached to the semi-hemispheric leg 11. One method is to place a loop 103 in the attachment end and to insert the semi-hemispheric leg 11 into the loop 103 as shown in FIG. 4. There is a primary lance 104 attached to the cord 100 on the lance end 101 of the cord and a secondary lance 105 attached to the cord on the attachment end 102.

In operation, a fish 200 is placed on the cord 100 by threading the primary lance 104 through the gills 201 and out through the mouth 202 of the fish 200 to rest upon the fish stringer apparatus 10. When the user decides to remove the fish 200 from the cord 100, the latch bar 18 is unlatched from the latch mechanism 21 and the latch bar is hingedly opened until the latch bar abuts the first stop 16 on the hinge base 15. The loop 103 of the attachment end 102 of the cord 100 is removed from the semi-hemispherical leg 11 of the fish stringer apparatus 10. This allows the fish 200 to be removed easily from the cord 100. The secondary lance 105 aids in the removal of the fish 200 by guiding the cord 100 from the mouth 202 and out of the gills 201 of the fish. If the user decides to keep a fish or fishes on the cord 100, the fish stringer apparatus 10 may be placed back on the attachment end 102 of the cord by threading the semi-hemispherical leg 11 back onto the loop 103 on the attachment end of the cord.

The foregoing descriptions and drawings of the invention are explanatory and illustrative only, and various changes in shape, sizes and arrangements of parts as well certain details of the illustrated construction may be made within the scope of the appended claims without departing from the true spirit of the invention.

I claim:

1. A fish stringer apparatus comprising:
   (a) a substantially semi-hemispheric leg;
   (b) a first end and a second end on the substantially semi-hemispheric leg;
   (c) a hinge mechanism attached to the first end;
   (d) the hinge mechanism comprising:
      a hinge base;
      a first stop on the hinge base; and
      a second stop on the hinge base;
   (e) a latch bar comprising:
      a hinge end; and
      a latch end;
   (f) the latch bar hingedly connected to the hinge mechanism at the hinge end of the latch bar;
   (g) a latch mechanism attached to the second end;
   (h) the latch bar adopted to be releasingly placed in the latch mechanism;
   (i) the latch bar abutting the second stop causing the latch end of the latch bar to stop below a level corresponding to an entrance to the latch mechanism such that the latch bar is bent above the entrance to the latch mechanism and is subsequently springingly biased down into the latch mechanism by way of the entrance;
   (j) a cord comprising:
      a lance end; and
      an attachment end;
   (k) the attachment end of the cord adapted to be releasingly attached to the semi-hemispheric leg;
   (l) a lance attached to the lance end.

2. A fish stringer apparatus comprising:
   (a) a substantially semi-hemispheric leg;
   (b) a first end and a second end on the substantially semi-hemispheric leg;
   (c) a hinge mechanism attached to the first end;
   (d) the hinge mechanism comprising:
      a hinge base;
      a first stop on the hinge base; and
      a second stop on the hinge base;
   (e) a latch bar comprising:
      a hinge end; and
      a latch end;
   (f) the latch bar hingedly connected to the hinge mechanism at the hinge end of the latch bar;
   (g) a latch mechanism attached to the second end;
   (h) the latch bar adapted to be releasingly placed in the latch mechanism;
   (i) the latch bar abutting the second stop causing the latch end of the latch bar to stop below a level corresponding to an entrance to the latch mechanism such that the latch bar is bent above the entrance to the latch mechanism and is subsequently springingly biased down into the latch mechanism by way of the entrance;
   (j) a cord comprising:
      a lance end; and
      an attachment end;
   (k) the attachment end of the cord adapted to be releasingly attached to the semi-hemispheric leg;
   (l) a primary lance attached to the cord on the lance end of the cord; and
   (m) a secondary lance attached to the cord on the attachment end.

* * * * *